(12) United States Patent
Neri

(10) Patent No.: US 10,062,116 B2
(45) Date of Patent: Aug. 28, 2018

(54) SYSTEM AND METHOD FOR PROVIDING MARKET DATA IN AN ELECTRONIC TRADING ENVIRONMENT

(71) Applicant: TRADING TECHNOLOGIES INTERNATIONAL, INC., Chicago, IL (US)

(72) Inventor: Mark Neri, Chicago, IL (US)

(73) Assignee: Trading Technologies International, Inc., Chicago, IL (US)

(*) Notice: Subject to any disclaimer, the term of this patent is extended or adjusted under 35 U.S.C. 154(b) by 0 days.

(21) Appl. No.: 14/496,047

(22) Filed: Sep. 25, 2014

(65) Prior Publication Data

US 2015/0142635 A1 May 21, 2015

Related U.S. Application Data

(63) Continuation of application No. 13/899,835, filed on May 22, 2013, now Pat. No. 8,874,478, which is a continuation of application No. 13/491,169, filed on Jun. 7, 2012, now Pat. No. 8,473,405, which is a continuation of application No. 12/771,930, filed on Apr. 30, 2010, now Pat. No. 8,219,482, which is a continuation of application No. 11/095,100, filed on Mar. 31, 2005, now Pat. No. 7,739,184.

(51) Int. Cl.
*G06Q 40/00* (2012.01)
*G06Q 40/04* (2012.01)
*G06Q 40/06* (2012.01)

(52) U.S. Cl.
CPC ............. *G06Q 40/04* (2013.01); *G06Q 40/00* (2013.01); *G06Q 40/06* (2013.01)

(58) Field of Classification Search
CPC .......... G06Q 40/00; G06Q 40/04; G06Q 40/06
See application file for complete search history.

(56) References Cited

U.S. PATENT DOCUMENTS

| | | | |
|---|---|---|---|
| 4,112,369 A | 9/1978 | Forman et al. | |
| 4,196,310 A | 4/1980 | Forman et al. | |
| 5,101,353 A * | 3/1992 | Lupien et al. | 705/37 |
| 5,161,103 A | 11/1992 | Kosaka et al. | |
| 5,987,440 A * | 11/1999 | O'Neil et al. | 705/44 |
| 6,100,824 A * | 8/2000 | MacLeod | H03M 7/3088 341/106 |

(Continued)

OTHER PUBLICATIONS

"Best Execution: A Candid Analysis" [online], Journal of Portfolio Management, vol. 29, No. 4, Jun. 2003, p. 37 (13 pages). [Retrieved on Nov. 21, 2009] from the Internet: www.dialogweb.com/cgi/dwclient?dwcommand=DWEBPRINT%2013-919522.

(Continued)

*Primary Examiner* — Bruce I Ebersman
*Assistant Examiner* — Mark H Gaw
(74) *Attorney, Agent, or Firm* — McDonnell Boehnen Hulbert & Berghoff LLP

(57) ABSTRACT

A system and methods are developed for providing market data in an electronic trading environment. One example method includes determining a probability model comprising a probability corresponding to a change in relation to a market data parameter, then, using the probability to generate a compressed bit stream representing the market data parameter, and providing the compressed bit stream to the client terminal.

9 Claims, 8 Drawing Sheets

(56) References Cited

U.S. PATENT DOCUMENTS

| | | | |
|---|---|---|---|
| 6,205,431 B1 | 3/2001 | Willemain et al. | |
| 6,321,212 B1 | 11/2001 | Lange | |
| 6,493,682 B1* | 12/2002 | Horrigan et al. | 705/36 R |
| 6,772,132 B1 | 8/2004 | Kemp, II et al. | |
| 6,876,981 B1* | 4/2005 | Berckmans | 705/35 |
| 6,912,511 B1 | 6/2005 | Eliezer et al. | |
| 6,961,685 B2 | 11/2005 | Sy | |
| 6,963,855 B1 | 11/2005 | Borzenko | |
| 7,020,630 B2 | 3/2006 | Russell et al. | |
| 7,080,117 B2* | 7/2006 | de Pinto et al. | 709/203 |
| 7,127,424 B2 | 10/2006 | Kemp, II et al. | |
| 7,167,837 B1* | 1/2007 | Ciampi et al. | 705/35 |
| 7,171,384 B1* | 1/2007 | Fitzpatrick et al. | 705/36 R |
| 7,171,385 B1 | 1/2007 | Dembo et al. | |
| 7,212,998 B1* | 5/2007 | Muller et al. | 705/36 R |
| 7,225,174 B2 | 5/2007 | Schreckengast et al. | |
| 7,236,953 B1* | 6/2007 | Cooper et al. | 705/36 R |
| 7,389,268 B1 | 6/2008 | Kemp, II et al. | |
| 7,417,568 B2 | 8/2008 | Fallon et al. | |
| 7,523,059 B2 | 4/2009 | Tezuka et al. | |
| 7,539,637 B2* | 5/2009 | Gatto | 705/36 R |
| 7,689,498 B2 | 3/2010 | Rodgers et al. | |
| 7,725,374 B2* | 5/2010 | Van Erlach et al. | 705/35 |
| 7,739,184 B1* | 6/2010 | Neri | G06Q 40/00 705/35 |
| 7,756,770 B2 | 7/2010 | Dembo et al. | |
| 7,788,158 B2* | 8/2010 | Pennock | 705/37 |
| 7,797,215 B1* | 9/2010 | Zerenner et al. | 705/36 R |
| 7,865,418 B2 | 1/2011 | Uenohara et al. | |
| 7,885,884 B2 | 2/2011 | Tuckman | |
| 8,010,438 B2* | 8/2011 | Waelbroeck et al. | 705/37 |
| 8,219,482 B2 | 7/2012 | Neri | |
| 8,473,405 B2 | 6/2013 | Neri | |
| 8,577,778 B2* | 11/2013 | Lange et al. | 705/37 |
| 8,606,685 B2* | 12/2013 | Keiser et al. | 705/37 |
| 8,639,629 B1* | 1/2014 | Hoffman | 705/67 |
| 8,706,586 B2* | 4/2014 | Rojewski et al. | 705/35 |
| 2001/0018676 A1 | 8/2001 | Iida et al. | |
| 2001/0026231 A1* | 10/2001 | Satoh | H03M 7/3086 341/87 |
| 2001/0056395 A1* | 12/2001 | Khan | 705/37 |
| 2002/0010663 A1* | 1/2002 | Muller | 705/30 |
| 2002/0010672 A1* | 1/2002 | Waelbroeck et al. | 705/37 |
| 2002/0052827 A1* | 5/2002 | Waelbroeck et al. | 705/37 |
| 2002/0128943 A1 | 9/2002 | Schreckengast et al. | |
| 2002/0147670 A1* | 10/2002 | Lange | 705/35 |
| 2002/0161677 A1* | 10/2002 | Zumbach et al. | 705/35 |
| 2003/0009419 A1* | 1/2003 | Chavez et al. | 705/38 |
| 2003/0028466 A1 | 2/2003 | Jenson et al. | |
| 2003/0033240 A1* | 2/2003 | Balson et al. | 705/37 |
| 2003/0061152 A1 | 3/2003 | De et al. | |
| 2003/0097327 A1* | 5/2003 | Anaya et al. | 705/37 |
| 2003/0126065 A1* | 7/2003 | Eng et al. | 705/37 |
| 2003/0149648 A1* | 8/2003 | Olsen et al. | 705/35 |
| 2003/0182224 A1* | 9/2003 | Horrigan et al. | 705/37 |
| 2003/0220835 A1* | 11/2003 | Barnes, Jr. | 705/14 |
| 2004/0042506 A1 | 3/2004 | Fallon et al. | |
| 2004/0059666 A1* | 3/2004 | Waelbroeck et al. | 705/37 |
| 2004/0128261 A1 | 7/2004 | Olavson et al. | |
| 2004/0148248 A1* | 7/2004 | Allen et al. | 705/37 |
| 2004/0177024 A1* | 9/2004 | Bok et al. | 705/37 |
| 2005/0004862 A1* | 1/2005 | Kirkland et al. | 705/38 |
| 2005/0021438 A1 | 1/2005 | Tezuka et al. | |
| 2005/0027634 A1* | 2/2005 | Gershon | 705/37 |
| 2005/0044027 A1 | 2/2005 | Rodgers et al. | |
| 2005/0080704 A1* | 4/2005 | Erlach et al. | 705/36 |
| 2005/0080710 A1 | 4/2005 | Malato | |
| 2005/0108148 A1* | 5/2005 | Carlson | 705/37 |
| 2005/0228735 A1* | 10/2005 | Duquette | 705/37 |
| 2005/0228743 A1 | 10/2005 | Warsaw et al. | |
| 2006/0020530 A1* | 1/2006 | Hsu et al. | 705/35 |
| 2006/0026090 A1* | 2/2006 | Balabon | 705/37 |
| 2006/0041500 A1* | 2/2006 | Diana et al. | 705/37 |
| 2006/0041503 A1* | 2/2006 | Blair et al. | 705/37 |
| 2006/0041518 A1* | 2/2006 | Blair et al. | 705/80 |
| 2006/0080203 A1 | 4/2006 | Tuckman | |
| 2006/0100949 A1* | 5/2006 | Whaley et al. | 705/36 R |
| 2006/0106708 A1 | 5/2006 | Abushaban et al. | |
| 2006/0136318 A1* | 6/2006 | Rafieyan et al. | 705/37 |
| 2006/0167784 A1* | 7/2006 | Hoffberg | 705/37 |
| 2006/0195391 A1 | 8/2006 | Stanelle | |
| 2007/0016476 A1* | 1/2007 | Hoffberg et al. | 705/14 |
| 2007/0027787 A1* | 2/2007 | Tripp | 705/36 |
| 2007/0038579 A1* | 2/2007 | Ansley | 705/64 |
| 2007/0106593 A1* | 5/2007 | Lin | 705/37 |
| 2007/0124227 A1 | 5/2007 | Dembo et al. | |
| 2007/0162365 A1* | 7/2007 | Weinreb | 705/35 |
| 2007/0162373 A1* | 7/2007 | Kongtcheu | 705/36 R |
| 2007/0198387 A1 | 8/2007 | Uenohara et al. | |
| 2008/0133430 A1* | 6/2008 | Horowitz | 705/36 R |
| 2010/0211529 A1 | 8/2010 | Neri | |
| 2012/0246057 A1 | 9/2012 | Neri | |
| 2014/0143112 A1 | 5/2014 | Neri | |
| 2015/0088726 A1* | 3/2015 | Aisen et al. | 705/37 |

OTHER PUBLICATIONS

Amihud, Y. and Mendelson, H., "Liquidity, Asset Prices and Financial Policy," Financial Analysts Journal, Nov.-Dec. 1991, vol. 47, No. 6, pp. 56-66.

Bodden, E., et al., "Arithmetic Coding Revealed: A Guided Tour from Theory to Praxis," Sable Technical Report No. 2007-5, McGille University, School of Computer Science, Sable Research Group, May 25, 2007, 60 pages.

Bodden, E., et al., "Arithmetic Coding Revealed: A Guided Tour from Theory to Praxis," Seminar Data Compression WS 2001/2002, Translated and Updated Version, May 2004, 56 pages.

Bodden, E., et al., "Arithmetische Kodierung," Proseminar Datenkompression WS 2001/2002, Mar. 18, 2002, 59 pages.

CCITT Recommendation T.81, Information Technology—Digital Compression and Coding of Continuous-Tone Still Images—Requirements and Guidelines, Sep. 1992, 186 pages. Available from the Internet: www.w3.org/Graphics/JPEG/itu-t81.pdf.

Le Gall, D. and Tabatabai, A., "Sub-band Coding of Digital Images Using Symmetric Short Kernel Filters and Arithmetic Coding Techniques", Bell Communications Research, Inc., IEEE, vol. 2, Apr. 11, 1998, pp. 761-764.

Lossless JPEG Web Page [online], Wikipedia, The Free Encyclopedia, n.d. [Retrieved on Apr. 2, 2009] from the Internet: http://en.wikipedia.org/wiki/Lossless_JPEG.

Maynard, T.H., "What is an "Exchange?"—Proprietary Electronic Securities Trading Systems and the Statutory Definition of an Exchange" [online], Washington & Lee Law Review, vol. 49, No. 3, Summer 1992, 63 pages. [Retrieved on Nov. 21, 2009] from the Internet: www.dialogweb.com/cgi/dwclient?dwcommand=DWEBPRINT%20485-369901.

Santa Cruz, D., et al., "JPEG 2000 Still Image Coding Versus Other Standards," Proceedings of SPIE vol. 4115, 45th Annual SPIE Meeting, Applications of Digital Image Processing XXIII, Jul. 2000, 11 pages.

Weinberger, M.J., et al., "The LOCO-I Lossless Image Compression Algorithm: Principles and Standardization into JPEG-LS," IEEE, vol. 9, No. 8, Aug. 2000, 1309-1324, originally as Hewlett-Packard Laboratories Technical Report No. HPL-98-193R1, Nov. 1998, revised Oct. 1999, 34 pages,. Available from the Internet: www.hpl.hp.com/loco/HPL-98-193R1.pdf.

* cited by examiner

PROBABILITY MODEL 300

| Parameter 302 | | Frequency 304 | Probability 306 | Number of Bits 308 |
|---|---|---|---|---|
| ES-Mar05 | | 20 | 0.487805 | 1.035624 |
| ES-Jun05 | | 8 | 0.195122 | 2.357552 |
| NQ-Mar05 | | 10 | 0.243902 | 2.035624 |
| NQ-Jun05 | | 2 | 0.04878 | 4.357552 |
| Other 310 | | 1 | 0.02439 | 5.357552 |
| Best Bid Change 312 | -1 | 3 | 0.142857 | 2.807355 |
| | 0 | 15 | 0.714286 | 0.485427 |
| | 1 | 2 | 0.095238 | 3.392317 |
| | Other | 1 | 0.047619 | 4.392317 |
| First Qty Change 314 | -13 | 1 | 0.047619 | 4.392317 |
| | -10 | 2 | 0.095238 | 3.392317 |
| | 0 | 12 | 0.571429 | 0.807355 |
| | 10 | 5 | 0.238095 | 2.070389 |
| | Other | 1 | 0.047619 | 4.392317 |
| Is 2$^{nd}$ Zero 316 | No | 20 | 0.952381 | 0.070389 |
| | Yes | 1 | 0.047619 | 4.392317 |
| 2$^{nd}$ Qty Change 318 | -10 | 1 | 0.047619 | 4.392317 |
| | 0 | 18 | 0.857143 | 0.222392 |
| | 10 | 1 | 0.047619 | 4.392317 |
| | Other | 1 | 0.047619 | 4.392317 |
| Last Price Change 320 | No | 11 | 0.55 | 0.862496 |
| | Yes | 9 | 0.45 | 1.152003 |
| Last Price Type 322 | Prev Bid | 4 | 0.444444 | 1.169925 |
| | Prev Ask | 2 | 0.222222 | 2.169925 |
| | Current Bid | 1 | 0.111111 | 3.169925 |
| | Current Ask | 1 | 0.111111 | 3.169925 |
| | Other | 1 | 0.111111 | 3.169925 |
| Last Price Change 324 | 1 | 1 | 0.5 | 1 |
| | Other | 1 | 0.5 | 1 |
| Last Qty Change 326 | 10 | 5 | 0.555556 | 0.847997 |
| | 20 | 3 | 0.333333 | 1.584963 |
| | 25 | 1 | 0.111111 | 3.169925 |

FIG. 3

PROBABILITY MODEL 600

| Parameter 602 | | Frequency 604 | Probability 606 | Number of Bits 608 |
|---|---|---|---|---|
| ES-Mar05 | | 21 | 0.5 | 1 |
| ES-Jun05 | | 8 | 0.190476 | 2.392317 |
| NQ-Mar05 | | 10 | 0.238095 | 2.070389 |
| NQ-Jun05 | | 2 | 0.047619 | 4.392317 |
| Other 610 | | 1 | 0.02381 | 5.392317 |
| Best Bid Change 612 | -1 | 4 | 0.181818 | 2.459432 |
| | 0 | 15 | 0.681818 | 0.552541 |
| | 1 | 2 | 0.090909 | 3.459432 |
| | Other | 1 | 0.045455 | 4.459432 |
| First Qty Change 614 | -13 | 1 | 0.045455 | 4.392317 |
| | -10 | 2 | 0.090909 | 3.459432 |
| | 0 | 13 | 0.590909 | 0.758992 |
| | 10 | 5 | 0.227273 | 2.137504 |
| | Other | 1 | 0.045455 | 4.459432 |
| Is 2$^{nd}$ Zero 616 | No | 21 | 0.954545 | 0.067114 |
| | Yes | 1 | 0.045455 | 4.459432 |
| 2$^{nd}$ Qty Change 618 | -10 | 1 | 0.045455 | 4.459432 |
| | 0 | 18 | 0.818182 | 0.289507 |
| | 10 | 2 | 0.090909 | 4.459432 |
| | Other | 1 | 0.045455 | 4.459432 |
| Last Price Change 620 | No | 11 | 0.52381 | 0.932886 |
| | Yes | 10 | 0.47619 | 1.070389 |
| Last Price Type 622 | Prev Bid | 5 | 0.5 | 1 |
| | Prev Ask | 2 | 0.2 | 2.321928 |
| | Current Bid | 1 | 0.1 | 3.321928 |
| | Current Ask | 1 | 0.1 | 3.321928 |
| | Other | 1 | 0.1 | 3.321928 |
| Last Price Change 624 | 1 | 1 | 0.5 | 1 |
| | Other | 1 | 0.5 | 1 |
| Last Qty 626 | 10 | 6 | 0.6 | 0.736966 |
| | 20 | 3 | 0.3 | 1.736966 |
| | 25 | 1 | 0.1 | 3.321928 |

FIG. 6

SYSTEM AND METHOD FOR PROVIDING MARKET DATA IN AN ELECTRONIC TRADING ENVIRONMENT

CROSS REFERENCE TO RELATED APPLICATIONS

This application is a continuation of U.S. patent application Ser. No. 13/899,835, filed on May 22, 2013, now U.S. Pat. No. 8,874,478, which is a continuation of U.S. patent application Ser. No. 13/491,169, filed on Jun. 7, 2012, now U.S. Pat. No. 8,473,405, which is a continuation of U.S. patent application Ser. No. 12/771,930, filed on Apr. 30, 2010, now U.S. Pat. No. 8,219,482, which is a continuation of U.S. patent application Ser. No. 11/095,100, filed on Mar. 31, 2005, now U.S. Pat. No. 7,739,184. The entire contents of each of these applications are herewith incorporated by reference into the present application for all purposes.

TECHNICAL FIELD

The present invention is directed to electronic trading. More specifically, the present invention is directed towards providing market data in an electronic trading environment.

BACKGROUND

Trading methods have evolved from an exclusively manual process to a technology enabled, electronic platform. With the advent of electronic trading, a user or trader can be in virtually direct contact with the market, from practically anywhere in the world, performing near real-time transactions, and without the need to make personal contact with a broker.

In particular, traders are connected to an exchange's electronic trading platform by way of a communication link and through an application program interface to facilitate real-time electronic messaging between themselves and the exchange. The electronic trading platform includes at least one electronic market, which is the heart of the trading system for a particular tradeable object and handles matching of bids and offers placed by the subscribing traders for that tradeable object. The electronic messaging includes market information that is sent from the electronic exchange to the traders. Once the traders receive market information, it may be displayed to them on their trading screens. Upon viewing the information, traders can take certain actions, including the actions of sending buy or sell orders to the electronic exchange, adjusting existing orders, deleting orders, or otherwise managing orders. Traders may also use software tools on their client devices to automate these and additional actions.

Just as with an open-outcry exchange, an electronic exchange can list any number of tradeable objects. Often times, traders will trade simultaneously more than one tradeable object, and they may trade simultaneously tradeable objects that are listed at more than one exchange. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

Ordinarily, each tradeable object has its own independent electronic market, and therefore, its own separate stream of market data, commonly referred to as a data feed. A data feed includes market information corresponding to a tradeable object, and the content of the data feed typically depends on the host exchange and on the tradeable object. Market information in a data feed commonly includes information related to the inside market and market depth. The inside market represents the lowest sell price (also referred to as the best or lowest ask price), and the highest buy price (also, referred to as the best or highest bid price). Then, market depth includes quantities available for trading the tradeable object at certain buy and sell price levels away from the inside market. The extent of market depth available for a trader usually depends on the exchange. For example, some exchanges provide market depth for an infinite number of price levels, while some provide only quantities associated with the inside market, and others may provide no market depth at all. Additionally, exchanges can offer other types of market information in the data feeds, such as the last traded price (LTP), the last traded quantity (LTQ), and order fill information.

Since each tradeable object is actually associated with its own separate stream of market information, in the instances when a trader trades more than one tradeable object, the trader will receive more than one data feed. In addition to receiving market information from exchanges, traders might subscribe to news feeds, real-time quotation vendors that provide information to traders for decision support, and other information sources.

Using client devices, such as a personal computer, laptop computer, hand-held computer, or other devices that have network access, a trader can link to host exchanges through one or more networks. A network is a group of two or more computers or devices linked together, and characterized by topology, protocol, and architecture. For example, some traders may link to the host through a direct network connection, such as a T1 or ISDN. Others may link to the host exchange through direct network connections, and through other common network components, such as high speed servers, routers, and gateways. The Internet, a well-known collection of networks and gateways, can be used to establish a connection between the client device and the host exchange. There are many different types of wired and wireless networks and combinations of network types known in the art that can link traders to the host exchange.

Many, if not all, networks being used by electronic exchanges have limited bandwidth capacity. Since adding network bandwidth is very expensive, many existing exchanges already limit the extent of market data being provided to their clients. Also, as the trading applications become more and more sophisticated, traders may wish to receive more content rich market data. Thus, it would be beneficial to provide a trading system that can meet current and future bandwidth needs.

BRIEF DESCRIPTION OF THE FIGURES

Example embodiments are described herein with reference to the following drawings, in which:

FIG. 3 is a block diagram illustrating an example probability model that can be defined in relation to a tradeable object;

FIG. 6 is a block diagram illustrating an updated probability model of FIG. 4 based on market data changes illustrated in FIG. 5;

DETAILED DESCRIPTION

I. Market Data Compression Overview

Figure 1:
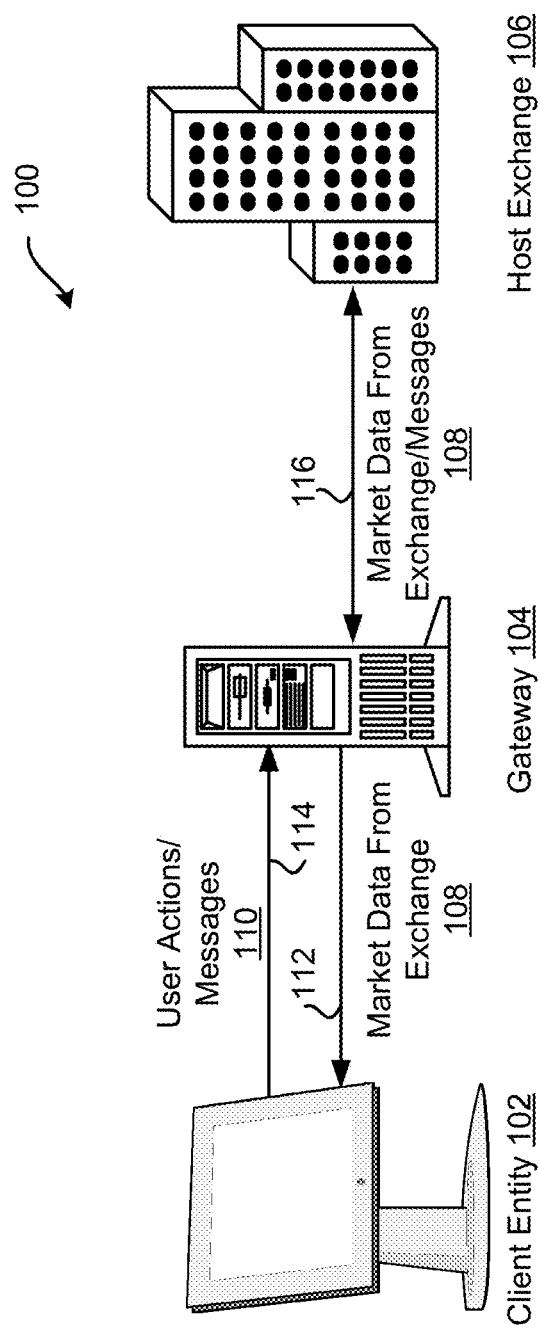
FIG. 1 is a block diagram illustrating an example network configuration that can be used to access one or more electronic exchanges.

The example embodiments, among other things, are directed to providing market data to client devices. Typical market data consists of a collection of prices and quantities corresponding to a tradeable object. In general, for any given tradeable object, the market at any instant is likely to be quite similar to the market in the previous instant, with the change being often zero. If the market moves, it often changes by +/−1 tick. These, as well as other market characteristics, are used in the example methods and systems described herein to develop statistical probability models for use in relation to statistical compression of market data.

More specifically, according to one example system, a sending entity, such as an electronic exchange, or yet some other entity in communication with the exchange, may include a probability modeler that dynamically develops a probability model for a tradeable object. For example, the probability model can be developed and dynamically updated based on market data being encoded and sent to a receiving entity, such as a client entity, over the network from the electronic exchange. More specifically, the probability model for a tradeable object may include a plurality of probability values corresponding to many different market data parameters. For example, the probability model may include a probability for detecting a change of +1 tick in relation to the best bid price in the market corresponding to the tradeable object. According to one example embodiment, the probability values in the model corresponding to the change in the best bid price may be determined based on how many times a change of +1 tick has been encoded in relation to the best bid price during a certain time period in the past. The statistical compressions methods can then use the developed probability model to generate a compressed bit stream representing the change in best bid price, as well as other market data changes, corresponding to the tradeable object. The compressed bit stream may then be sent over one or more networks to the client entity.

According to one example embodiment, a receiving entity also includes probability models that are used to decode received compressed bit streams. In such an embodiment, the probability model that was used at the time of encoding a change in a certain market parameter is the same as the one that is used at the receiving entity at the time of decoding the change. To keep the two probability models synchronized, the models can be updated after encoding and decoding the change corresponding to the market parameter. More details related to market data compression using probability models will be described below.

While the example embodiments are described herein with reference to illustrative embodiments for particular applications, it should be understood that the example embodiments are not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the example embodiments may be operated in an entirely software embodiment, in an entirely hardware embodiment, or in a combination thereof. However, for sake of illustration, the example embodiments are described in a software-based embodiment, which is executed on a computer device. As such, the example embodiments take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

In an electronic trading environment, when an authorized trader selects a tradeable object, the trader may access market data related to the selected tradeable object(s). Referring to FIG. 1, an example communication that might occur between an electronic exchange and a client entity is shown. During a trading session, market data 108, in the form of messages, may be relayed from a host exchange 106 over communication links 116 and 112 to a client entity generally indicated as 102. The client entity 102 may be a single client terminal that is used by a single trader or multiple client terminals corresponding to multiple traders associated with one or more trading groups. The client entity 102 may include any computer that accesses one or more networks. For example, the client entity 102 can be a personal computer, a laptop computer, a hand-held device, and so on.

As illustrated in FIG. 1, intermediate devices, such as gateway(s) 104, may be used to facilitate communications between the client entity 102 and the host exchange 106. It should be understood that while FIG. 1 illustrates the client entity 102 communicating with a single host exchange 106, in an alternative embodiment, the client entity 102 could establish trading sessions to more than one host exchange. Also, it should be understood that information being communicated to and from the client entity 102 and the exchange 106 could be communicated via a single communication path.

The market data 108 contains information that characterizes the tradeable objects, including, among other parameters, order related parameters, such as price and quantity, and the inside market, which represents the lowest sell price (also referred to as the best or lowest ask price), and the highest buy price (also referred to as the best or highest bid price). In some electronic markets, market data may also include market depth, which generally refers to quantities available for trading the tradeable object at certain buy price levels and quantities available for trading the tradeable object at certain sell price levels. The methods for providing market data according to the example embodiments will be described in greater detail below.

In addition to providing the tradeable object's order book information, electronic exchanges can offer different types of market information such as total traded quantity for each price level, opening price, last traded price, last traded quantity, closing price, or order fill information. It should be understood that market information provided from an electronic exchange could include more or fewer items depending on the type of tradeable object or the type of exchange. Also, it should be understood that the messages provided in the market data 108 may vary in size depending on the content carried by them, and the software at the receiving end may be programmed to understand the messages and to act out certain operations.

A trader may view the information provided from an exchange via one or more specialized trading screens created by software running on the client entity 102. Upon viewing the market information or a portion thereof, a trader may wish to take actions, such as send orders to an exchange, cancel orders at the exchange, or change order parameters, for example. To do that, the trader may input various commands or signals into the client entity 102. Upon receiving one or more commands or signals from the trader, the client entity 102 may generate messages that reflect the actions taken, generally shown at 110. It should be understood that different types of messages or order types can be submitted to the host exchange 106, all of which may be considered various types of transaction information. Once generated, user action messages 110 may be sent from the client entity 102 to the host exchange over communication links 114 and 116.

The client entity 102 may use software that creates specialized interactive trading screens on the client entity 102. The trading screens enable traders to enter and execute orders, obtain market quotes, and monitor positions. The range and quality of features available to the trader on his or her screens varies according to the specific software application being run. In addition to or in place of the interactive trading screens, the client entity 102 may run automated non-interactive types of trading applications.

A commercially available trading application that allows a user to trade in systems like those shown in FIG. 1 and subsequent figures is X_TRADER® from Trading Technologies International, Inc. of Chicago, Ill. X_TRADER® also provides an electronic trading interface, referred to as MD Trader™, in which working orders and bid/ask quantities are displayed in association with a static price axis or scale. As mentioned above, the scope of the example embodiments described herein are not limited by the type of terminal or device used, and are not limited to any particular type of trading application. Portions of the X_TRADER® and the MD Trader™-style display are described in U.S. Pat. No. 6,772,132 entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, and U.S. patent application Ser. No. 10/125,894, entitled "Trading Tools for Electronic Trading," filed on Apr. 19, 2002, the contents of each are incorporated herein by reference.

A. Market Data Compression System Architecture

Figure 2:
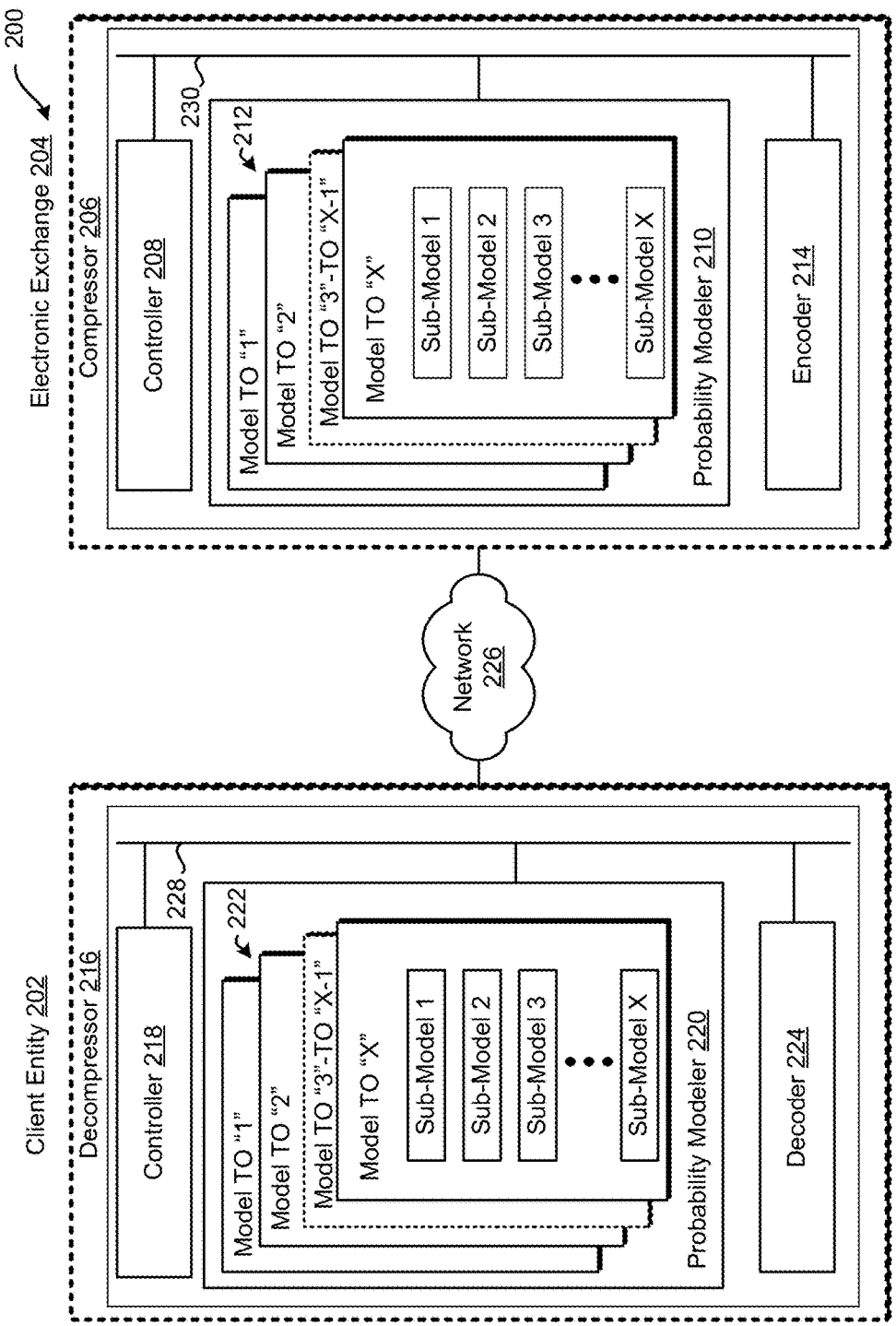
FIG. 2 is a block diagram illustrating an example system that can be used for market data compression according to one example embodiment.

FIG. 2 is a block diagram illustrating an example system 200 that can be used for market data compression according to one example embodiment. The example system 200 illustrates a client entity 202 and an electronic exchange 204 communicating via a network 222. According to the example embodiments that will be described in greater detail below, the electronic exchange 204 uses statistical compression techniques to compress market data that is provided to the client entity 202. While FIG. 2 shows only certain elements of the exchange 204 and client entity 202 that can be used in relation to data compression/decompression, it should be understood that a typical exchange and a client entity may include many additional elements, such as interfaces, processors, and applications, that can be used for receiving and processing data being communicated between the exchange 204 and the client entity 202. Also, it should be understood that while FIG. 2 illustrates a single network 222 that is used for sending data between the client entity 202 and the electronic exchange 204, the two entities could communicate via multiple networks and additional intermediate devices, such as gateways, routers, or yet some other network devices. Additionally, while the compression elements are illustrated as being part of the exchange 204, alternatively, these elements could be located on some other network entity in communication with the electronic exchange 204.

The electronic exchange 204 includes a compressor system 206. The compressor system in turn includes a controller 208, a probability modeler 210, and an encoder 214. The client entity 102 includes a decompressor system 216 with a controller 218, a probability modeler 220, and a decoder 224. The compressor system 206 can use one or more compression algorithms that are to compress market data using statistical probability data according to the embodiments that will be described in greater detail below. The decompressor system 216 can use one or more decompression algorithms along with the statistical probability data to decompress any compressed data received from the electronic exchange 202. The principals of statistical data encoding and decoding are well known in the art, and more details related to these processes can be found, for example, in the publication "Arithmetic Coding Revealed," by Eric Bodden, et al., fully incorporated herein by reference. The relevant theorem being relied on herein is that the minimum number of compressed bits that can be used to represent a symbol is "$-\log_2(p(S))$," where "S" is the symbol/parameter to be encoded, and "p" is the probability predicted for the symbol/parameter. The symbols, as used hereinafter, can refer to any parameter related to market data, such as a symbol being used to identify a tradeable object, a market level, a price level, or yet a different parameter associated with market data.

As an example, using "$-\log_2(p(S))$" to determine a minimum number of bits that can be used to represent a symbol, if the probability of occurrence of a symbol is 0.25, the symbol could be represented with $-\log_2(0.25)$ bits, or 2 bits. It should be understood that the number of bits that can be used to represent a symbol does not necessarily have to be represented with integer numbers. Alternatively, the number of bits could be represented with decimal numbers as well. For example, if a symbol is predicted with probability of 0.9, it would be represented with $-\log_2(0.9)$ bits, or approximately 0.152 bits. In relation to encoding market data parameters, such as encoding changes in the inside market prices or quantities, the above equation would take a format of $-\log_2$ (Tradeable Object Parameter Probability).

The probability modelers 210 and 220 generate market data probability models 212 and 222. According to the example embodiment shown in FIG. 2, the compressor system 206 uses the probability models 212 to compress and encode market data and generate a compressed data stream to be sent to the client entity 202. Similarly, the probability models 222 can be used at the client entity 202 to decode and decompress received compressed data stream. The probability models include statistical data representing the probabilities of detecting a change in relation to certain parameters associated with market data, the examples of which will be described in relation to subsequent figures.

The probability models could be dynamic or static. The example embodiments hereinafter describe probability models that are dynamically generated and updated during a trading day based on a frequency or history of changes in relation to certain parameters that the modeler has already seen. For example, the probability model for symbols A, B, and C that has seen the sequence of symbols ABACAABC, where, for example, the symbols correspond to changes detected in relation to three market levels, the probability modelers 210 and 220 could predict that the probability that the next symbol will be A is 4/8 or 0.5, and B and C would be predicted with the probability of 2/8 or 0.25. Sometimes, it may be known that certain symbols are not possible in a given context. In such cases, these symbols could be removed from consideration as the next possible symbol. For example, referring to the above example, if it is known that A could not be the next symbol, B and C would each be predicted with the probability of 2/4 or 0.5. The process of updating the probability models 210 and 222 could be performed by controllers 208 and 218, respectively.

According to one example embodiment, each tradeable object could be associated with its own probability model. FIG. 2 shows a plurality of probability models created for a plurality of tradeable objects, "TO 1" through "TO X." Each tradeable object probability model may in turn include a number of probability sub-models. A probability sub-model may define probability levels for one or more market data parameters associated with the tradeable object. As mentioned earlier, typical market data that will be compressed consists of a collection of prices and quantities corresponding to a tradeable object. For each tradeable object, there are two sides of market depth, a bid side and an ask side, along with a variety of different parameters, such as a last traded price and a last traded quantity. The market depth, as mentioned earlier, may include a preset number of levels ranging from only the inside market to an unlimited number of levels. While the number of market depth levels that will be compressed may be equal to the number of market depth levels typically provided by the exchange, fewer market depth levels could be compressed as well.

FIG. 3 is a block diagram illustrating an example probability model 300 that can be defined in relation to a tradeable object. The probability model 300 includes a "Parameter" field 302, a "Frequency" field 304, a "Probability" field 306, and a "Number of Bits" field 308. When sending market data, the probability models can be used to predict the tradeable object that has changed. As mentioned earlier, to ensure that a change in a tradeable object can be represented as a bit sequence, every tradeable object symbol is assigned at least some non-zero probability.

As shown in FIG. 3, the first sub-model is a "Tradeable Object Symbol" model 310 that can be used to encode a symbol associated with a specific tradeable object. The sub-model 310 includes five tradeable objects, ES-Mar05, ES-Jun05, NQ-Mar05, NQ-Jun05, and "Other" to be used in relation to other tradeable objects that are not specifically defined in the model 310. It should be understood that the models are not limited to any specific tradeable objects and could be defined in relation to fewer, more, or different tradeable objects than those shown in FIG. 3. Also, any parameters described in relation to the model 300 should not be viewed as limiting, but as examples only.

The "Frequency" field 304 specifies the number of times a change has been detected in relation to a specific tradeable object during a predetermined time period. It should be understood that any time period could be used, such as one or more trading days starting from the time when the markets open, or some other user-defined time interval. The frequency data in the probability models are preferably updated such that at the time of encoding certain market data parameter the frequency values at both ends of the network are the same. More details related to updating the probability models will be described below. According to one example embodiment, the probability modelers 208 and 216 could monitor changes in market data, and then could update the numbers in the frequency field 304 every time a certain symbol associated with a tradeable object is encoded/decoded. To improve accuracy of frequency data, the probability modelers 208 and 216 could weigh recent data more heavily than older data. To do that, the modelers could consider only a fixed number of previous encodings in making its predictions. Alternatively, exponential weighting methods could be used to decrease weigh for less recently encoded parameters. Also, rather than starting frequency models from no data at all, the frequency values could be initiated using historical data so that the probability models can be used to make reasonable predictions before being dynamically encoded a sufficient number of times to build the most current probability models. It should be understood that those skilled in the art will understand that different methods could also be used to determine/update the Frequency values.

The sub-models 312-326 correspond to the tradeable object ES-Mar05. According to one example embodiment, each tradeable object listed in the Tradeable Object Symbol sub-model 310 would be associated with its own probability models, such as those described below. Alternatively, certain tradeable objects could be highly correlated with each other, such as, for example, options on the same tradeable object with similar strike prices and expiration dates. In such an embodiment, a single probability model with a plurality of sub-models could be used to encode/decode more than one tradeable object. Those skilled in the art will appreciate that different variations of grouping and developing the probability models described herein are possible as well.

Referring to the probability model 300, the frequency of detecting a change in relation to the tradeable object having the symbol ES-Mar05 is 20, as specified in the Frequency column 304. Based on that frequency value, the probability of detecting a change in relation to market data associated with the tradeable object is 0.487805, as specified in the Probability column 306. According to the example embodiment in FIG. 3, the probability of 0.487805 for the ES-Mar05 is determined by dividing the frequency corresponding to the symbol (in this example, 20) by the total number of frequencies corresponding to all tradeable objects in the model (in this example, 41). The number of bits to encode the symbol ES-Mar05 is 1.035624, as defined in the "Number of Bits" column 308. According to the example embodiments presented herein, the number of bits can be determined using the formula referenced above, "$-\log_2(p(S))$," which in this example corresponds to $-\log_2(0.487805)$, or 1.035624 bits. It should be understood that the number of bits could be rounded to a specific number of decimal places predefined to be used in relation to the number of bits and/or probability values.

The example embodiments described herein in reference to encoding and decoding price levels and quantities use the incremental approach to represent a change in the market. In general, for any given tradeable object, the market at any given instant is likely to be quite similar to the market in the previous instant. Often, this number is zero. If it is not zero, it is often either +1 or −1, or some other number. While the probability sub-models described below use such incremental approach, it should be understood that different methods to represent a change or specific values could be used as well.

The probability model 300 further includes the "Best Bid Change" probability sub-model 312, which can be used to encode the best bid price movement. According to the "Best Bid Change" sub-model 310, for example, the frequency of the best bid being one tick lower than the previous one is 3, and the number of bits that will be used to encode such a change is 2.807355. The frequencies of the best bid being at the same market level, at one tick higher, or yet at some other level are also provided in relation to the "Best Bid Change" sub-model 312, and correspond to the frequencies of 15, 12, and 1, respectively. The probability values and the corresponding number of bits to be used to encode and decode each change are shown in columns 306 and 308.

In addition to encoding data related to price levels, such as the best bid price, quantity related data associated with a plurality of price levels can be encoded as well. According to one example embodiment, the process of encoding prices and quantities can be continued until encoding of a preset number of non-zero market depth levels is complete. One example quantity encoding/decoding sub-model is illustrated in relation to the "First Qty Change" sub-model 314. The sub-model 314 shows five example values representing a quantity change, including a change by −13, −10, 0, 10, and "Other." For example, if there has been no change in the quantity, which corresponds to the "0" change, this information will be represented using 0.807355 bits. It should be understood that the quantity change values being used in the "First Qty Change" sub-model 314 can be determined by the probability modelers 208 and 216 based on market activity or prior encodings.

According to one example embodiment, quantities at price levels other than the best bid price can be encoded and decoded using two probability sub-models. The first sub-model can be used to encode and decode whether the quantity at that price level is zero. Then, only if there is pending quantity at the price level, the second sub-model can be used to encode the difference between the new quantity and the last known quantity. This specific implementation is shown in relation to the sub-models 316 and 318. The first sub-model 316 is used to encode the information whether the quantity at the second price level (the price level following the best bid) is zero. Then, the sub-model 318 can be used to encode the relative level of the current quantity as compared to the previously known quantity at the same price level. It should be understood that negative quantity change values in the probability sub-models that would lead to non-positive quantity can be factored out of the sub-model before encoding any quantity changes.

It should be understood that while the probability model 300 in FIG. 3 illustrates only one sub-model corresponding to a quantity at the price level below the best bid price, additional sub-models could be created as well for additional price levels. Also, while FIG. 3 only shows sub-models corresponding to the bid side of the market, similar sub-models would be developed for prices and quantities corresponding to the ask side of the market.

In addition to encoding prices and corresponding quantities, the probability sub-models could also be used to encode other parameters that are typically provided in relation to market data. The probability model 300 shows one such example in relation to the last traded price and the corresponding last traded quantity. The Last Price Change sub-model 320 can be used to encode whether the last traded price is different from the previously provided last traded price. For example, as shown in relation to the sub-model 320, the probability of the last traded price being different than the previous traded price is 0.45, and such information could be encoded using 1.152003 bits. Then, if the last traded price is different, the type of the current last traded price could be encoded using the probability sub-model "Last Price Type" 322. The "Last Price Type" sub-model 322 defines a few types, including, a previous bid ("Prev Bid"), a previous ask ("Prev Ask"), "Current Bid," "Current Ask," and "Other." While the probability sub-model 322 shows five types that can be used in relation to the last traded price, different definitions could be used as well. Using the probability sub-model 322, if the current last traded price corresponds to the previous bid, this information can be encoded using 1.169925 bits. Then, the change in the last traded price can be encoded using the "Last Price Change" sub-model 324. If the last traded price changes by +1 tick, then, such a change can be encoded using 1 bit. It should be understood that similar probability sub-models could be defined for different market related parameters as well, and the example embodiments are not limited to the last traded price only. The quantity corresponding to the last traded quantity can be encoded using the "Last Qty" sub-model 326. For example, if the last traded quantity is 10, that value will be encoded using 0.847997 bits. It should be understood that the quantity values illustrated in relation to the sub-model 326 are only examples, and different values could also be specified in the model based on the historical values corresponding to the last traded quantities.

Figure 4:
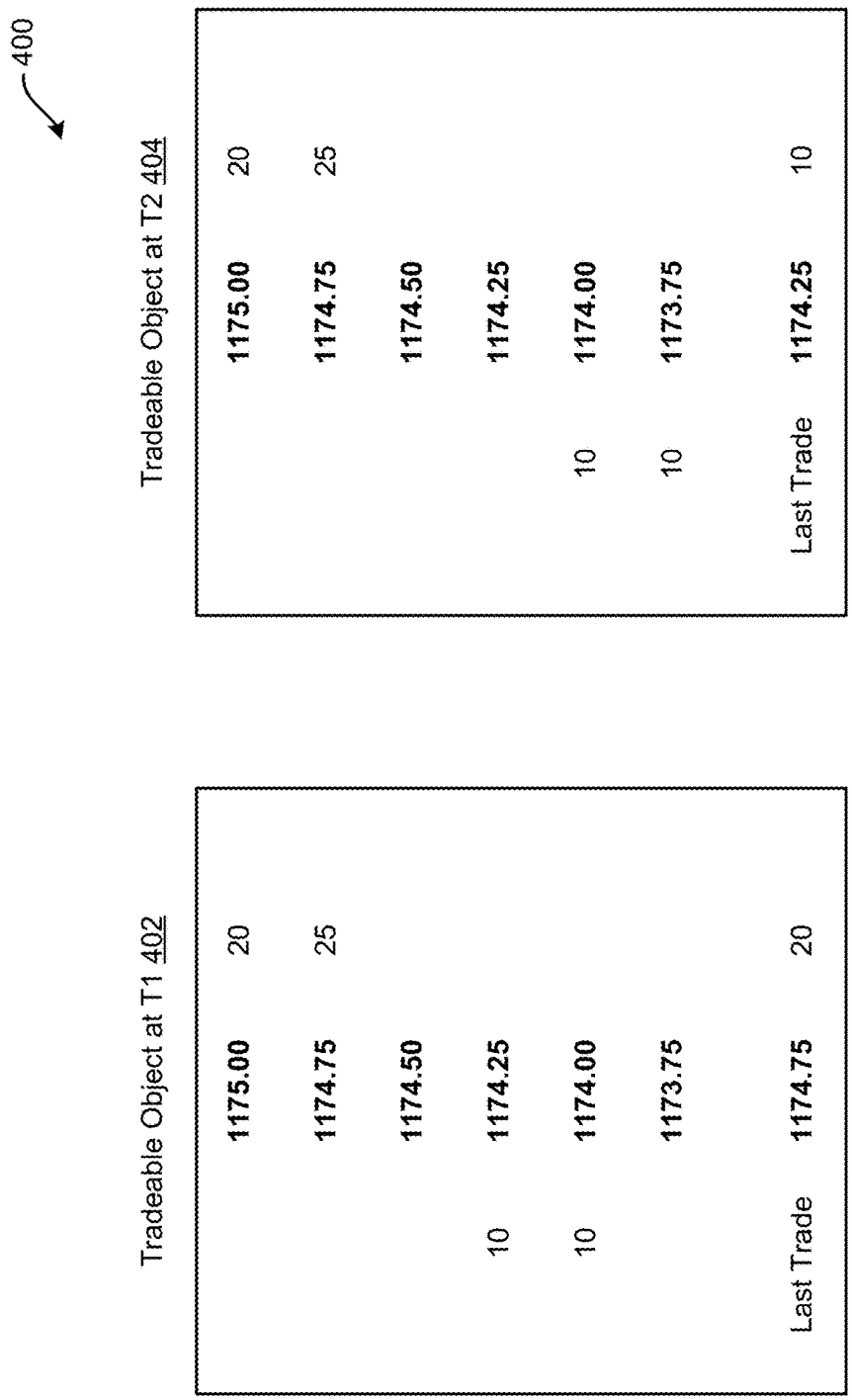
FIG. 4 is a block diagram illustrating two market depth snapshots corresponding to a tradeable object at two consecutive times.

FIG. 4 is a block diagram 400 illustrating two market depth snapshots 402 and 404 corresponding to a tradeable object at two consecutive times, T1 and T2. The two market snapshots include six price levels, ranging from 1175.00 to 1173.75, and the corresponding quantity values. As shown in relation to the market depth 402 corresponding to time T1, the best bid having the quantity of 10 is at the price level of 1174.25, while the best ask corresponds to the price level of 1174.75 and has the quantity of 25. The market depth snapshot 402 also indicates that the last traded quantity of 20 was traded at the price level of 1174.75. The market depth snapshot 404 illustrates market depth corresponding to the same tradeable object at time T2. According to the snapshot 404, the market has moved, resulting in the best bid quantity of 10 being now at the price level of 1174.00, and a new available quantity of 10 being at 1173.75. Also, as indicated in relation to the market snapshot 404, the last traded quantity of 10 was traded at the price level of 1174.25. The market data illustrated in FIG. 4 will be used hereinafter to illustrate methods for encoding market data using probability models described in FIG. 3, and updating the probability models based on the changes in the market data to generate updated probability models.

Figure 5:
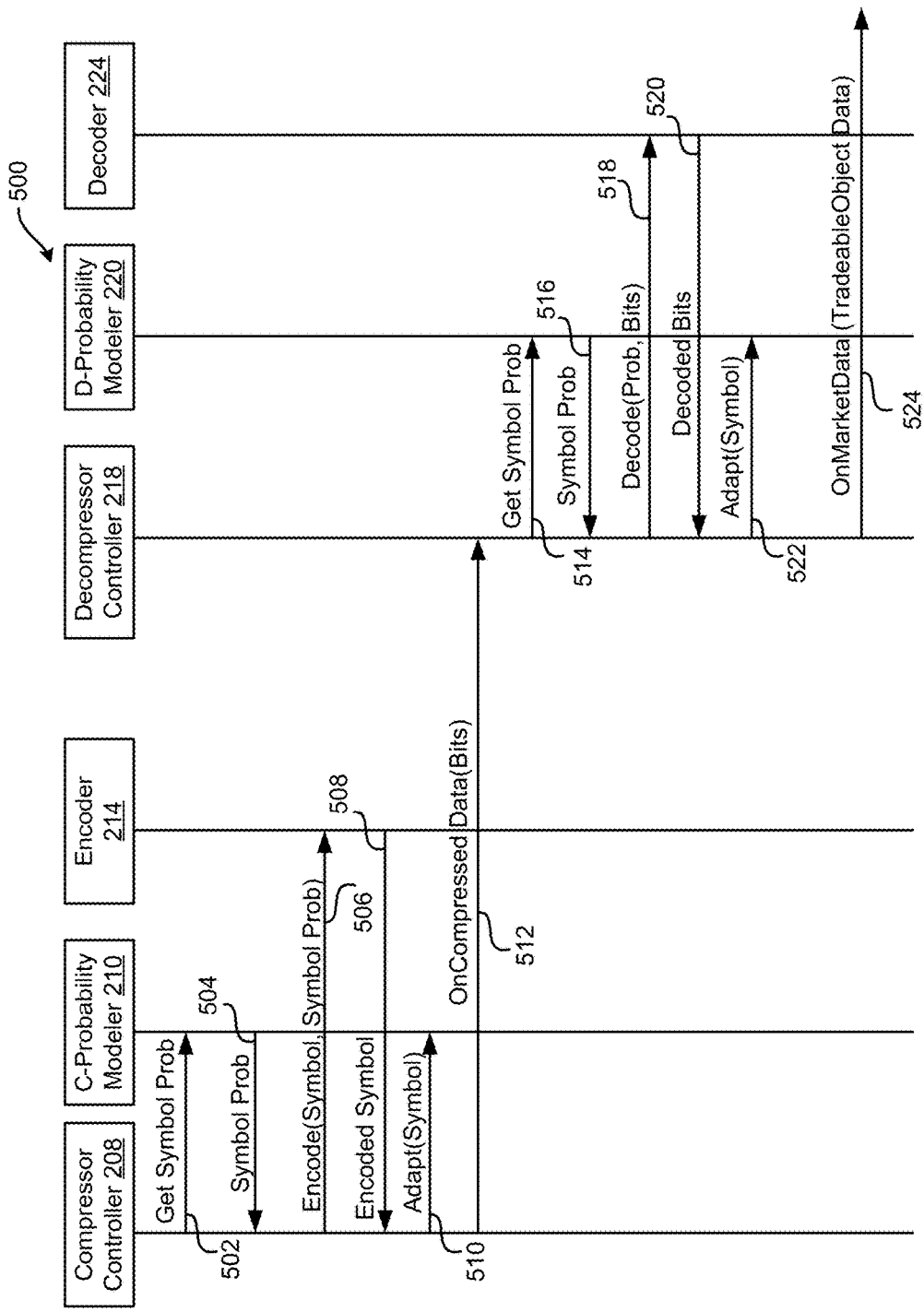
FIG. 5 is a message flow diagram illustrating an example method for providing market data to a client entity using data encoding based on probability models.

FIG. 5 is a message flow diagram 500 illustrating a method for providing market data to a client entity using data encoding based on probability models. The message flow diagram 500 will be described in relation to the entities illustrated in FIG. 2. However, it should be understood that the messages could be used in relation to different network entities as well. Also, while FIG. 5 illustrates a sequence of messages, the example embodiments are not limited to this specific message sequence, and the same operations could be accomplished using more or fewer messages that can be sent in a different order than that shown in FIG. 5.

The message flow diagram 500 will be used to illustrate the process of encoding/decoding the change in the best bid price corresponding to the tradeable object based on the market depth data illustrated in FIG. 4. Also, it will be assumed that the market depth data illustrated in FIG. 4 corresponds to the ES Mar05 having the current probability model illustrated in FIG. 3.

Referring to FIG. 5, when the compressor system 206 detects a request to encode a change in the best bid price, such as, in this example, a change from 1174.25 to 1174.00, the compressor controller 208 may query the probability modeler 210 to get probability data to be used in relation to encoding the best bid price associated with ES Mar05. According to one example embodiment, the compressor controller 208 may send a request to the probability modeler 210, such as a "Get Symbol Prob" request 502, illustrated in FIG. 5, to get the probability data for the best bid price corresponding to the ES Mar05. The probability modeler 210 may then look up the requested data in the probability models 212, and provide the requested data to the compressor controller 208, as shown in "Symbol Prob" 504. The "Get Symbol Prob" request 502 may include an identifier being used for encoding the best bid price corresponding to the ES Mar05. The "Symbol Prob" 504 may in turn include the probability value to be used for encoding the change in the best bid price. If the probability value is provided, the encoder 214 may use it to determine the number of bits to be used to encode the change in the best bid price. Alternatively, the "Symbol Prob" 504 could define the number of bits to be used to encode the change in the best bid price.

Referring back to the example market depth data in FIG. 4 and the probability model in FIG. 3, the probability of the best bid changing by −1 tick is 0.142857, and the number of bits that can be used to encode this change is 2.807355. According to the example embodiment, the "Symbol Prob" 504 can include the probability value, the number of bits, or both values. Referring back to FIG. 5, the compressor controller 208 may then send a request to the encoder 214 to encode the best bid change, as shown with "Encode (Symbol, Symbol Prob)" 506. The request 506 may include an indicator of the symbol to be encoded, here the best bid, and the symbol probability data, in this example, either the probability value, the number of bits to be used to encode the change, or both.

The encoder 214 may then encode the change in the best bid price using the provided probability data. According to the example probability sub-model 312 in FIG. 3, the change in the best bid by −1 tick would be encoded using 2.807355 bits. The encoder 214 may then provide the encoded best bid change data back to the compressor controller 208. The compressor controller 208 may then update the probability sub-model corresponding to the best bid price. This update is illustrated in "Adapt (Symbol)" request 510. More specifically, according to one example embodiment used in relation to the probability models described herein, the frequency value corresponding to −1 tick change in the best bid change probability sub-model will be increased by 1 to the frequency of 4, and the values for the probabilities as well as the number of bits to be used to compress the best bid changes will be recalculated accordingly. The updated best bid change probability sub-model is illustrated in relation to FIG. 6 at 612, more details of which will be described in greater detail below.

The compressor 206 then sends the compressed and encoded data corresponding to the best bid price change to the decompressor system 216, as shown at 512, and the data 512 is received at the decompressor controller 218. It should be understood that, in another embodiment, the encoder 214 could first encode all changes in the market corresponding to a tradeable object before sending any data; however, different embodiments are possible as well. When the decompressor controller 218 receives the compressed and encoded data bits corresponding to the best bid price change, it gets the probability data corresponding to the best bid change from the probability modeler 220, as shown at 514 to decode the received data. According to the example embodiment, the probability data at the probability modeler 220 is the same as the probability data that was used to encode the best bid change at the compressor side of the system before updating the corresponding probability sub-model. Using the same probability data, the decoder 224 can correctly decode the received data. When the decompressor controller 218 receives the probability data, as shown at 516, it can send the received data and the probability data to the decoder 224. Upon decoding the data, the decoder 224 may provide the decoded bits to the decompressor controller 218. Upon decoding the received data, the probability sub-model corresponding to the best bid price change can be updated so that it matches the current best bid price change sub-model at the compressor side of the market, as shown at 522. In the example provided herein, the updated best bid probability sub-model on the decompressor side will correspond to the sub-model 612 illustrated in FIG. 6.

Once the received data is decoded and decompressed, the decompressor controller 218 can provide the data to a trading application for display at the client entity. The data could be provided to different applications as well. It should be understood that the same or similar methods could be used to encode/decode other changes in the market. Also, it should be understood that while FIG. 5 illustrates individual messages being used in relation to a single market data parameter, in an alternative embodiment, a single message can be used to convey information associated with a plurality of market data parameters. For example, the "Get Symbol Prob" message 502 can be used to query the probability modeler 210 for probability data corresponding to more than one market data parameter, such as market data parameters other than corresponding to the best bid price, in this example. Similarly, the "Encode" message 506 could include a request to encode more than one market data parameter.

FIG. 6 is a block diagram illustrating an updated probability model of FIG. 4 based on market data illustrated in FIG. 5. The probability model 600 shows the probability sub-models discussed in relation to FIG. 3, and updated based on the market changes illustrated in FIG. 4. In addition to modification of the "Best Bid Change" sub-model 612 based on a change in the best bid price by −1 tick, other sub-models are updated accordingly. The "First Qty Change" sub-model 614 has been updated based on the best bid quantity being the same as the previous best bid quantity. As shown in relation to the "First Qty Change" sub-model 614, the frequency value corresponding to "0" quantity change is updated from 12 to 13. Then, the probability values and the number of bits shown in columns 606 and 608 are recomputed accordingly for each best bid change value.

Also, while not shown in FIG. 6, since the current quantity value is 10, the quantity changes corresponding to −13 and −10 could be excluded from the "First Qty Change" sub-model 614 since they would lead to a negative quantity or no quantity at all at the best bid price in relation to the next quantity value of the corresponding bid price. In such an embodiment, the probability values corresponding to "0," "10," and "Other" changes would be recomputed accordingly.

Referring next to the "Is $2^{nd}$ Zero" probability sub-model 616, since the quantity available at the next to the best available bid price, here the price level of 1173.75, is not zero, the frequency value corresponding to the "No" parameter is updated from 20 to 21. Also, since the quantity at the price level of 1173.75 has increased from 0 to 10, the frequency value corresponding to the change of 10 in the "$2^{nd}$ Qty Change" probability sub-model 618 is increased from 1 to 2, and the probabilities as well as the values corresponding to the number of bits to be used for encoding data are recalculated accordingly.

FIG. 4 also shows a change in the last traded price and the last traded quantity, with the last traded price changing from 1174.75 to 1174.25, and the last traded quantity changing from 20 to 10. The change in the last traded price is used to update the "Last Price Change" probability sub-model 620. Also, since the last traded price corresponds to the previous bid price, the "Last Price Type" sub-model 622 is updated by increasing the frequency value corresponding to the "Prev Bid" from 4 to 5. Also, since the last traded price corresponds to one of the price types listed in the "Last Price Type" sub-model 622, no changes are shown in relation to the "Last Price Change" sub-model 624. Finally, since the last traded quantity is 10, the frequency corresponding to the value of "10" in the "Last Qty" sub-model 626 has been updated from 5 to 6.

Figure 7:
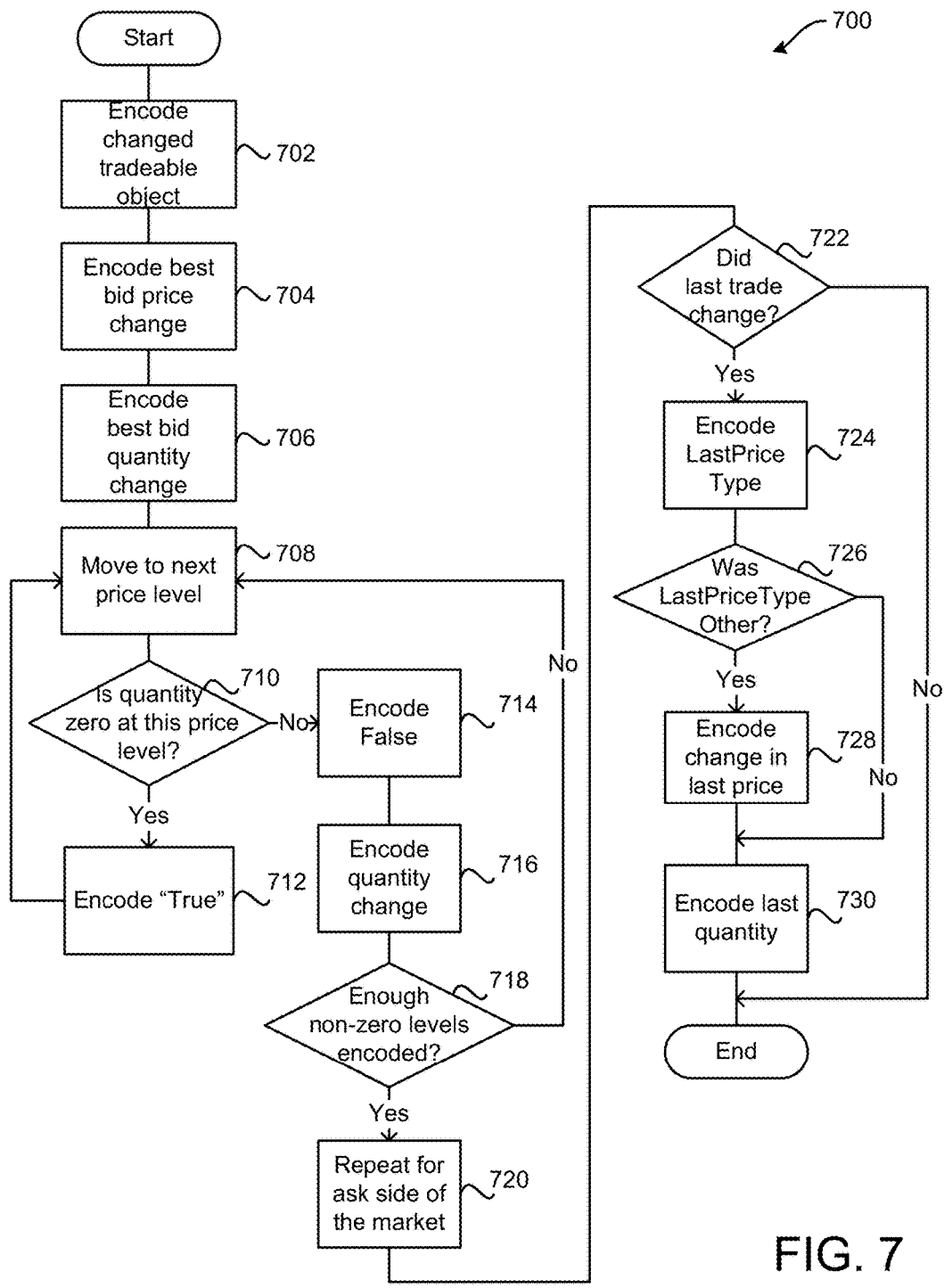
FIG. 7 is a flowchart illustrating an example method for encoding market data according to one example embodiment.

FIG. 7 is a flowchart 700 illustrating an example method 700 for encoding market data. It should be understood that each block in this and subsequent flowcharts may represent a module, segment, or portion of code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the present invention. The flowchart 700 will be described in relation to the components illustrated in FIG. 2. However, it should be understood that more, fewer, or different components could also be used to execute the method 700.

Referring to FIG. 7, at step 702, the encoder 214 encodes a symbol corresponding to a tradeable object with respect to which a change in market data has been detected. It should be understood that each step of encoding in FIG. 7 involves using methods and probability models discussed in relation to the preceding figures. At step 704, the encoder 214 encodes a change in the best bid price corresponding to the tradeable object. As explained in relation to preceding figures, encoding a change in the best bid price may include encoding that there has been no change in the best bid price. At step 706, the encoder 214 encodes a quantity change corresponding to the best bid. Then, at step 708, the encoder moves to the next price level on the bid side of the market corresponding to the tradeable object. At step 710, the encoder 214 determines if the quantity at the next price level is zero. Then, if the quantity at the next price level is zero, at step 712, the encoder 214 encodes it as "True," and moves to the next price level on the bid side of the market, as shown at 708. Referring back to step 710, if the quantity at that price level is not zero, the encoder 214 encodes it as "False," as shown at 714. Then, since the quantity is not zero, at 716, the encoder 214 can encode the quantity change.

According to one example embodiment, the exchange 204 may provide a certain number of market depth levels, and, based on that number, the encoder 214 may be programmed to encode and provide a certain number of market depth levels to the client entity 202. It should be understood that the number of market depth levels to be encoded at the encoder 214 could be the same or lower than that being normally provided from the exchange 204. Also, the number of market depth levels to be encoded by the encoder 214 may be determined by the number of non-zero market depth level, e.g., the market depth levels having non-zero quantity values. At step 718, the encoder 214 determines if enough non-zero market depth levels have been already encoded. If not, the method 700 continues at step 708. Otherwise, as shown at 720, the encoder 214 proceeds to encoding the ask side of the market corresponding to the tradeable object. According to one example embodiment, the encoder 214 could encode the ask side of the market by following the steps that were used to encode the bid side of the market, which in this example correspond to steps 704-718.

When the encoder 214 encodes the market depth information, it can also encode other market related parameters. The method 700 illustrates the process that can used to encode the last traded price and the last traded quantity. However, it should be understood that different parameters could be encoded using the same or similar methods. At step 722, the encoder 214 determines if data related to the last trade has changed. If no changes in the last traded quantity or price have been detected the method 700 terminates. Otherwise, at step 724, the encoder 214 encodes the type of the last traded price. The type of the last traded price could be a last bid, a last ask, or yet different types, the examples of which were defined earlier. Then, at step 726, the encoder 214 determines if the last price type was encoder as "Other." If so, at 728, the encoder 214 will encode the change in the last traded price. At step 730, the encoder 214 may encode the last traded quantity, and the method 700 terminates. As mentioned earlier, the method 700 could continue if the encoder 214 is programmed to encode additional market data related parameters.

Figure 8:
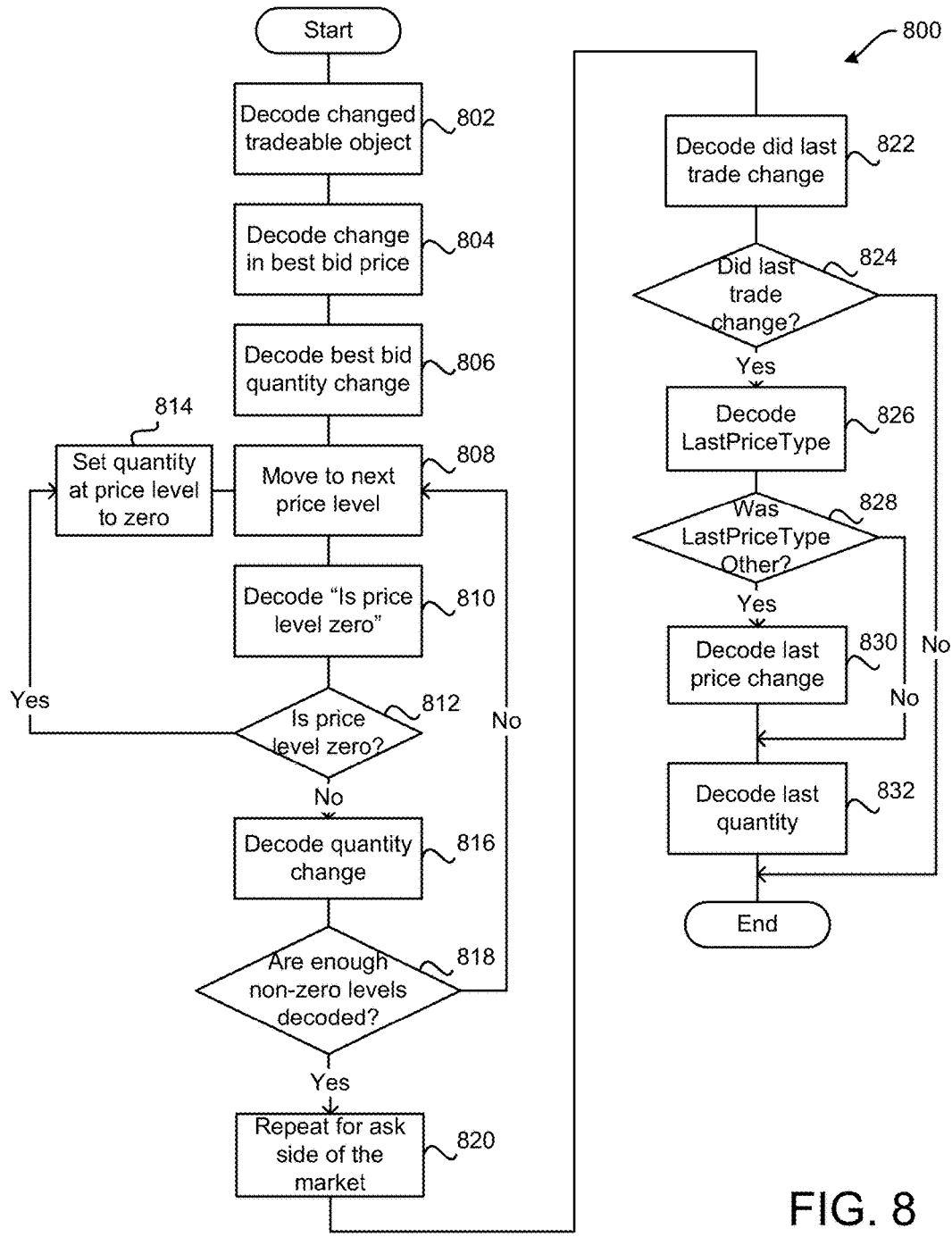
FIG. 8 is a flowchart illustrating an example method for decoding market data according to one example embodiment.

FIG. 8 is a flowchart illustrating an example method 800 for decoding market data.

When the encoded market data is received at the decoder 224, at step 802, it may first decode the symbol corresponding to a tradeable object associated with the received data. Similarly to the method 700, it should be understood that each decoding step described in relation to the method 800 may involve using the probability models and methods described above. At step 804, the decoder 224 may decode a change in the best bid price. At steps 804 and 806, the decoder 224 decodes a change in the best bid price and the best bid quantity. At step 808, the decoder 224 may move to decoding the next price level. At step 810, the decoder 224 decodes the bit sequence defining if the next price level is zero. At step 812, the decoder 224 determines if the next price level is zero. If it is, at step 814, it sets the quantity level at that price level to zero, and the method 800 continues at step 808. Referring back to step 812, if the price level is not zero, at step 816, the decoder 224 decodes a quantity change corresponding to that price level. At step 818, the decoder 224 determines if it has decoded enough non-zero price levels. It should be understood that this number can be preconfigured on the decoder, or it could be provided in relation to the encoded data received from the exchange. If not enough non-zero price levels have been decoded, the method 800 continues at step 808. Otherwise the steps described above in relation to decoding the bid side of the market are repeated for the ask side of the market, as shown at step 820.

Once the decoder 224 decodes market data corresponding to the bid and ask side of the market, the decoder 224 may proceed to decoding other market related parameters. Decoding of such parameters will be described in relation to decoding data related to the last trade; however, different parameters could be decoded as well. At step 822, the decoder 224 decodes data defining if the last trade has changed. At step 824, based on the decoded data, the decoder 224 determines if the last trade has changed. If the last trade has not changed, the method 800 terminates. Otherwise, at step 826, the decoder 224 decodes the last traded price type. Then, at step 828, the decoder 224 determines if the last traded price type was decoded to be "Other." If it was not, the method continues at step 832. If it was, at step 830, the decoder 224 decodes the last traded price change. Then, at step 832, the decoder 224 decodes the last traded quantity, and the method 800 terminates.

It will be apparent to those of ordinary skill in the art that methods involved in the system and method for encoding/decoding market data using probability data may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method including:

configuring by a controller of a compression system of a computing device in communication with an electronic exchange and a client entity a probability model to be associated with a price parameter for a tradeable object, wherein the compression system includes the controller, the probability model, and an encoder, wherein the probability model includes a probability of occurrence of an input symbol associated with the price parameter;

configuring by the controller of the compression system of the computing device the probability model to further be associated with a quantity parameter for the tradeable object, wherein the probability model includes a probability of occurrence of an input symbol associated with the quantity parameter;

receiving by the compression system of the computing device a price value for the price parameter for the tradeable object, wherein the price value is provided to the compression system of the computing device by the electronic exchange;

receiving by the compression system of the computing device a quantity value for the quantity parameter for the tradeable object, wherein the quantity value is provided to the compression system of the computing device by the electronic exchange;

calculating by the compression system of the computing device a price difference, wherein the price difference is a change in value between the price value for the price parameter for the tradeable object and a previous price value for the price parameter for the tradeable object;

calculating by the compression system of the computing device a quantity difference, wherein the quantity difference is a change in value between the quantity value for the quantity parameter for the tradeable object and a previous quantity value for the quantity parameter for the tradeable object;

updating by the controller of the compression system of the computing device the probability model associated with the price parameter for the tradeable object based on the calculated price difference;

updating by the controller of the compression system of the computing device the probability model associated with the quantity parameter for the tradeable object based on the calculated quantity difference;

encoding by the encoder of the compression system of the computing device the calculated price difference using a statistical data encoder to generate an encoded price difference representing the calculated price difference, wherein the calculated price difference is an input symbol to the statistical data encoder, wherein the statistical data encoder is based on the probability model associated with the price parameter for the tradeable object;

encoding by the encoder of the compression system of the computing device the calculated quantity difference using the statistical data encoder to generate an encoded quantity difference representing the calculated quantity difference, wherein the calculated quantity difference is an input symbol to the statistical data encoder, wherein the statistical data encoder is based on the probability model associated with the quantity parameter for the tradeable object;

generating by the compression system of the computing device an update message including the encoded price difference and the encoded quantity difference; and sending by the compression system of the computing device the update message to the client entity.

2. The method of claim 1, wherein the price parameter for the tradeable object is a best bid price parameter.

3. The method of claim 1, wherein the price parameter for the tradeable object is a best ask price parameter.

4. The method of claim 1, wherein the price parameter for the tradeable object is a last traded price parameter.

5. The method of claim 1, wherein the probability model includes a plurality of sub-models, wherein a first sub-model of the plurality of sub-models is associated with the price parameter for the tradeable object, wherein updating the probability model includes updating the first sub-model based on the calculated price difference.

6. The method of claim 1, wherein the probability model includes a plurality of sub-models, wherein a first sub-model of the plurality of sub-models is associated with the price parameter for the tradeable object, wherein a second sub-model of the plurality of sub-models is associated with the quantity parameter for the tradeable object.

7. The method of claim 6, wherein updating the probability model associated with the price parameter for the tradeable object includes updating the first sub-model based on the calculated price difference, wherein updating the probability model associated with the quantity parameter for the tradeable object includes updating the second sub-model based on the calculated quantity difference.

8. The method of claim 1, wherein the computing device is part of the electronic exchange.

9. The method of claim 1, wherein the computing device is part of a gateway.

* * * * *